United States Patent [19]

Müller

[11] Patent Number: 4,510,654
[45] Date of Patent: Apr. 16, 1985

[54] HOLDER FOR FILTER BAGS FOR PREPARING TEA AND THE LIKE

[76] Inventor: Herbert Müller, Im Elm 24a, 5450 Neuwied 21, Fed. Rep. of Germany

[21] Appl. No.: 509,857

[22] Filed: Jun. 30, 1983

[30] Foreign Application Priority Data

Jun. 30, 1982 [DE] Fed. Rep. of Germany ....... 3224355

[51] Int. Cl.³ .............................................. A44B 21/00
[52] U.S. Cl. ..................................... 24/344; 24/3 M; 24/155 CC; 24/343
[58] Field of Search ................ 24/344, 343, 7, 8, 3 M, 24/3 L, 49 CF, 563, 150 FP, 150 B, 155 CC; 132/46 A, 48 R

[56] References Cited

U.S. PATENT DOCUMENTS

| | | | |
|---|---|---|---|
| 365,389 | 6/1887 | Koegel | 24/344 |
| 1,248,450 | 12/1917 | Burke | 24/150 B |
| 1,376,801 | 5/1921 | Downes | 24/344 |
| 2,168,946 | 8/1939 | Rogers | 24/344 |
| 2,194,609 | 3/1940 | Miller | 24/3 M |
| 3,082,773 | 3/1963 | Renstrom et al. | 132/48 R |
| 3,170,470 | 2/1965 | Solomon | 132/46 A |
| 3,348,272 | 10/1967 | Germani | 24/563 |
| 3,416,202 | 12/1968 | Sasaoka | 24/563 |
| 3,633,592 | 1/1972 | Buglio | 132/48 R |
| 4,011,639 | 3/1977 | Koleske | 132/46 A |

FOREIGN PATENT DOCUMENTS 827091 2/1960 United Kingdom ............. 132/48 R

Primary Examiner—Victor N. Sakran
Attorney, Agent, or Firm—Becker & Becker, Inc.

[57] ABSTRACT

A holder for filter bags for preparing tea and similar beverages. A clamping body is provided which is embodied in a manner similar to a hair clip, and has three legs which extend approximately parallel to one another. The two outer legs are preloaded relative to one another in a known manner in such a way that they can be brought out of one stable end position (closed position) by closing the angular aperture between the central leg and the two outer legs into the other stable end position (closed position), in which respective slot-like, narrow openings remain between the edges of the central leg and the respectively adjacent edges of the two outer legs. Also provided is a chain, one end of which is fastened to the clamping body, and the other end of which is provided with a hook which is suitable for fastening the chain on components of a brewing container.

3 Claims, 3 Drawing Figures

HOLDER FOR FILTER BAGS FOR PREPARING TEA AND THE LIKE

BACKGROUND OF THE INVENTION

The present invention relates to a holder for filter bags for preparing tea and similar beverages.

Various embodiments of holders for such filter bags are known, some of which have proven to be quite satisfactory in practice. However, the constructions involved with the filter holders which have been offered in the marketplace require a relatively great expenditure for material. Furthermore, some of these holders are also relatively complicated, so that a simple operation thereof is not possible.

An object of the present invention is to provide a novel and practical filter holder for filter bags for preparing tea and similar beverages, which filter bag holder is distinguished by an amazingly simple handling and that also can be manufactured considerably more economically than is the case with heretofore known filter bag holders for preparing tea and the like.

BRIEF DESCRIPTION OF THE DRAWING

This object, and other objects and advantages of the present invention, will appear more clearly from the following specification in conjunction with the accompanying drawing, in which:

FIG. 1 is a front view of one embodiment of the invention holder for filter bags for preparing tea and the like;

SUMMARY OF THE INVENTION

Figure 1:
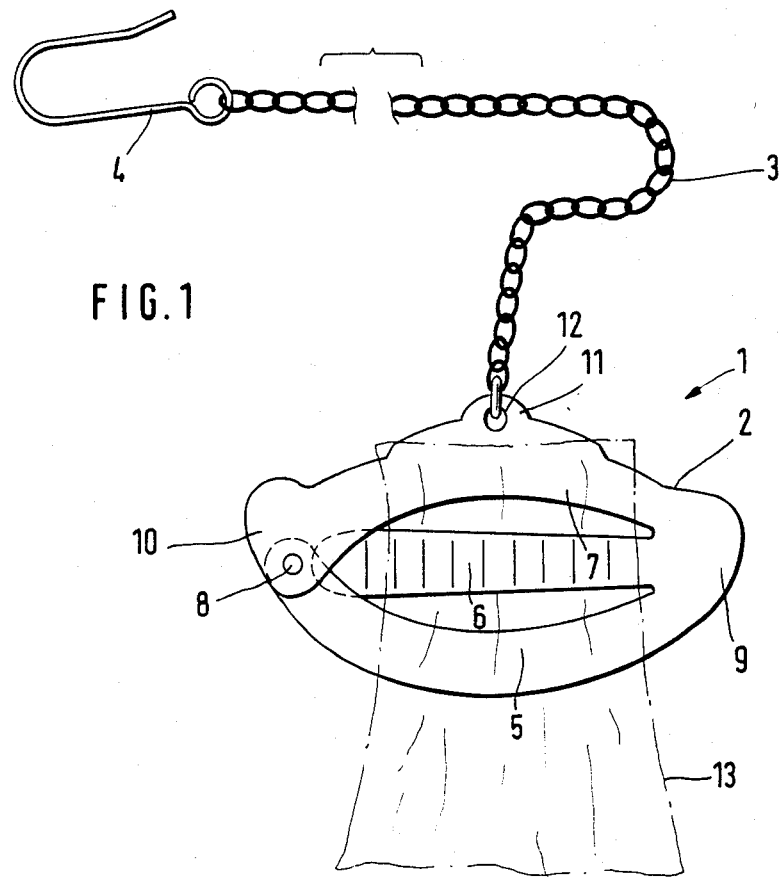

The holder of the present invention is characterized primarily by a clamping body which resembles a hair clip and has three legs which extend approximately parallel to one another; of these legs, the two outer legs are preloaded relative to one another in a known manner in such a way that they can be brought out of the one stable end position (opened position), by closing the angular aperture between the central leg and the two outer legs, into the other stable end position (closed position), in which respective slot-like, narrow openings remain between the edges of the central leg and the respectively adjacent edges of the two outer legs; the holder is further characterized by a chain or the like, one end of which is fastened to the clamping body, and the other end of which is provided with a hook or the like which is suitable for fastening the chain to components of a brewing container.

Pursuant to one advantageous specific embodiment of the inventive holder, the chain may be fastened approximately in the middle of one of the two outer legs. In this manner, when the holder together with a filter bag filled with tea is removed from the brewing container, the chain engages at least approximately above the center of gravity of the holder and tea bag. This facilitates handling. It may furthermore also be expedient to embody the holder in such a way that the associated outer leg is widened in the region of the fastening spot for the chain. This improves still further the desired equilibrium condition during removal of the holder with the filter bag from the brewing container.

By appropriate design of the width of the slot-like narrow opening between the adjacent edges of the three legs, the open end of the filter bag can be held reliably and without difficulty by the holder, even in the case of a larger tea bag. Nevertheless, it may be expedient pursuant to a further embodiment of the present invention to provide adjacent edges of the legs of the clamping body with an at least partially zigzagged or wavelike configuration. This, of course, improves the support of the bag in the holder.

In order to be able to use the holder without difficulty, in particular with regard to the known snapping effect of the clamping body for clamping the filter bag in position, the holder may, at those ends on both sides of the chain, be provided with separately formed handgrips. These handgrips do not affect the clamping effect which is exerted on the filter bag and proceeds from the aforementioned legs of the clamping body. Rather, these handgrips exclusively facilitate the simple handling of the holder.

A particularly noteworthy feature of the inventive holder for filter bags in comparison to the heretofore known holders is that the inventive holder is not dependent upon the shape of the brewing container, and especially not upon the shape and the dimensions of the filling opening of the brewing container. Of course, it is conceivable to rest the inventive holder, for example, on the opening edge of a pot or of a cup, as is the case with known holders. However, such use of the inventive holder is in no way necessary or even preferred. Precisely the possibility of immersing the holder together with the filter bag into the brewing liquid can on the one hand produce readily recognizable economical advantages with regard to smaller dimensioned filter bags and also smaller embodiments of the holder, and on the other hand can also improve the drawing process by better utilization of the tea leaves floating within the filter bag in the water or in the brewing liquid.

DESCRIPTION OF A PREFERRED EMBODIMENT

Referring now to the drawing in detail, the inventive holder is indicated generally with the reference numeral 1. The holder 1 comprises a clamping body 2 to which is fastened a chain 3 which is provided with a hook 4. The clamping body 2 is embodied in the manner resembling a hair clip, and has three legs or pieces 5, 6, and 7 which extend approximately parallel to one another. The holder 1 preferably comprises stainless or rust proof spring steel. The free ends of the legs 5 and 7 are rigidly connected by means of a rivet 8 in a known manner under the effect of a certain predetermined preload in such a way that the legs 5 and 7, in the manner known from hair clips, can be brought into one or the other stable end positions. The other ends of the legs 5 and 7 merge with the associated adjacent end of the central leg 6 into an end region which is embodied as the handgrip 9. In conformity with the handgrip 9, the opposite ends of the legs 5 and 7, in the region of the rivet 8 or another rigid connection, are embodied as an approximately corresponding handgrip 10.

A hole 12 is provided approximately in the middle of the widened portion 11 of the leg 7. One end of the chain 3 engages at this hole 12, while the hook 4 is fastened to the other end of the chain 3. With the aid of the hook 4, the holder 1 can be suspended on components of the brewing pot or container while the brewing is taking place. The hook 4 with the chain 3 also serves as a handling means for the holder.

Figure 2:
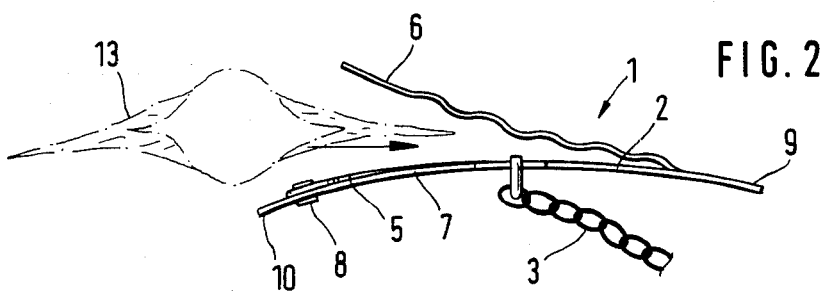
FIG. 2 is a plan view in the opened position of the holder of FIG. 1.
Figure 3:
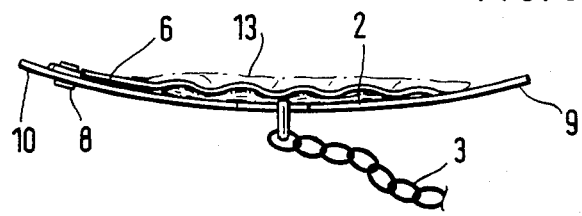
FIG. 3 is a plan view in the closed position of the holder of FIG. 1.

In FIGS. 2 and 3, as well as in FIG. 1, the introduction of a filter bag into the opened holder 1, and the position of a filter bag in a closed holder 1, is shown by dashed lines.

The hole 12 is located approximately in the middle or at a location approximately centrally of the leg 7 of the holder 1, so that consequently the chain 3 engages approximately above the center of gravity of the holder 1 and the filled filter bag 13. This, of course, facilitates handling. The configuration of the portion 11 with the arrangement of the hole 12 also contributes to this.

The central leg 6 has a zigzagged or wavelike configuration approximately transverse to its longitudinal direction in the region of the opposing longitudinal edges thereof. This zigzagged or wavelike configuration can be clearly seen in FIG. 2. This configuration, which would also be possible for the facing portions of the legs 5 and 7, contributes to a still better holding of a filter bag, which can have a considerable weight, especially after a brewing process has been terminated and as a result of the liquid absorbed by the tea leaves. By proper manipulation of the handgrips 9 and 10, the filter bag 13 can then, after a brewing process, and without having to touch it any further, be released, for example over a waste container.

By suitable dimensioning of the holder 1, especially the distance between the handgrips 9 and 10, the holder can be designed, for example, in such a way that, during the brewing process, the holder does not rest, for example, on the opening edge of a pot, but rather is located along with the filter bag in the brewing liquid.

In order to more clearly illustrate the functioning of the inventive holder, its manner of operation will be subsequently described in detail.

Prior to use, or when not in use, it is assumed that the holder will be maintained in a closed position, i.e. the position illustrated in FIG. 3, whereby the central leg 6 does not project from the remainder of the clamping body 2, as it does in the position illustrated in FIG. 2. In this closed position, the inventive holder has a somewhat convex configuration when viewed in the positions illustrated in FIGS. 1 and 3. This is a result of the preloaded state of the two outer legs 5, 7 relative to one another.

In order to be able to insert a filter bag, e.g. one containing tea leaves, between the central leg 6 and the remainder of the clamping body 2, the leg 6 must be moved away from the latter. To accomplish this, the backs of the handgrips 9 and 10 are, for example, supported on the fingers of one or both hands. One or both thumbs are then placed approximately on the middle of the front, or convex, side of the holder 1, and pressure is exerted by the thumb or thumbs against the central and outer legs 5, 6, and 7. This pressure is exerted until the clamping body 2 "snaps", with the front of the latter now having a somewhat concave configuration (see FIG. 2), and the leg 6 projecting to the rear away from the curved plane formed by the remainder of the body 2. The holder 1 is now in the open position, and the top of a filter bag can be inserted in the angular aperture produced between the central leg 6 and the two outer legs 5 and 7. To clamp the filter bag in position, the clamping body must now be brought into the closed position. This is accomplished by reversing the aforementioned procedure. In other words, pressure is exerted from the back, or now convex side, of the clamping body 2, e.g. by the fingers of one or both hands, against the central and outer legs 5, 6, and 7, until the clamping body 2 again "snaps", this time in the opposite direction, and the clamping body 2 returns to the convex closed position illustrated in FIG. 3.

It should be noted that the placement of the fingers and thumbs can be reversed, or another manner of manipulation can also be used. The important aspect is the production of the "snapping" action of the clamping body 2.

Pursuant to one specific embodiment of the present invention, the holder 1 may have the general configuration of a miniature tea kettle, with one of the handgrips 9, 10 being formed by the "handle" of the tea kettle, and the other handgrip being formed by the "pour spout" of the tea kettle.

The present invention is, of course, in no way restricted to the specific disclosure of the specification and drawing, but also encompasses any modifications within the scope of the appended claims.

What I claim is:

1. A holder having a generally oblong configuration for filter bags which are to be used in the preparation of tea and similar beverages; said holder comprising:
   a clamping body including handles at each end of the oblong configuration and also including three legs which extend approximately parallel to one another in intermediate location between the handles at each end of the oblong configuration with one of said legs being a central leg having only one end connected with said clamping body and having a gripping means for retaining the tea bag filter therewith, and the other two legs being outer legs, one of which is disposed on each of the opposite longitudinal edges of said central leg; said two outer legs being preloaded relative to one another in such a way that said two outer legs can be brought into either one of two different stable end positions, namely an open position, and a closed position; in said open position, an angular aperture existing between said central leg on the one hand, and said outer legs on the other hand, with said central leg projecting out of a curved plane formed by said outer legs; in said closed position, a narrow slot-like opening existing between each of said longitudinal edges of said central leg, and the adjacent longitudinal inner edges of the adjacent outer legs;
   a chain-like member having two ends, one of which is fastened to said clamping body at a location substantially centrally of one of said outer legs so that consequently said chain-like member engages substantially above center of gravity of said holder for filter bags used in preparation of tea and the like; and
   a hook-like member connected to the other end of said chain-like member for fastening the latter to components of a brewing container.

2. A holder according to claim 1, in which said chain-like member is fastened via a clamping body widened portion having a hole located approximately in the middle of one of said two outer legs of said clamping body and formed by a configuration of said clamping body widened portion that contributes to facilitating handling of said holder with the arrangement of the hole to further improve desired equilibrium condition during removal of the holder with the filter bag from the brewing container.

3. A holder according to claim 1, in which said central leg of said clamping body has an at least partially wave-like configuration as said gripping means for gripping the filter bag used in the preparation of tea and the like.

\* \* \* \* \*